United States Patent [19]

Avramidis et al.

[11] Patent Number: 5,154,674
[45] Date of Patent: Oct. 13, 1992

[54] POWER TRANSMISSION CHAIN CONSTRUCTED WITH ASYMMETRICAL LINKS

[75] Inventors: Stellios A. Avramidis, Port Huron, Mich.; Timothy J. Ledvina, Groton, N.Y.

[73] Assignee: Borg-Warner Automotive Transmission & Engine Components Corporation, Sterling Heights, Mich.

[21] Appl. No.: 514,510

[22] Filed: Apr. 25, 1990
(Under 37 CFR 1.47)

[51] Int. Cl.⁵ .............................................. F16G 13/04
[52] U.S. Cl. .................................................. 474/214
[58] Field of Search ........ 474/201, 206, 210, 212–217, 474/226, 233

[56] References Cited

U.S. PATENT DOCUMENTS

| | | | |
|---|---|---|---|
| 1,027,352 | 5/1912 | Morse | 474/215 |
| 1,534,494 | 4/1925 | Belcher | 474/214 |
| 3,377,875 | 4/1968 | Sand | 474/157 |
| 3,495,468 | 2/1970 | Griffel | 474/157 |
| 4,342,560 | 8/1982 | Ledvina et al. | 474/213 |
| 4,509,323 | 4/1985 | Ledvina et al. | 29/407 |
| 4,509,937 | 4/1985 | Ledvina et al. | 474/213 |
| 4,569,671 | 2/1986 | Ledvina | 474/201 |
| 4,650,445 | 3/1987 | Mott | 474/201 |
| 4,758,210 | 7/1988 | Ledvina | 474/213 |
| 4,832,668 | 5/1989 | Ledvina et al. | 474/155 |
| 4,915,675 | 4/1990 | Avramidis | 474/213 |
| 4,915,676 | 4/1990 | Komeya | 474/213 |

FOREIGN PATENT DOCUMENTS

| | | | |
|---|---|---|---|
| 178818 | 4/1986 | European Pat. Off. | 474/212 |
| 164042 | 8/1985 | Japan | 474/212 |

*Primary Examiner*—Thuy M. Bui
*Assistant Examiner*—Roger J. Schoeppel
*Attorney, Agent, or Firm*—Willian Brinks Olds Hofer Gilson & Lione

[57] ABSTRACT

A power transmission chain is formed of a plurality of randomly oriented sets of links. Pivot means connect adjacent sets of links by fitting into a pair of apertures in the links. Each of the links of the chain has a pair of toes separated by a crotch. Each of the toes is defined by an outside flank and an inside flank. The links of the chain are asymmetrical in configuration with some links being oriented in a first direction and other links being oriented in the opposite direction. The asymmetrical form includes a first toe having an inside flank of a first configuration and a second toe having an inside flank of a different configuration. The first configuration includes either a substantially straight surface or a surface of a different configuration.

12 Claims, 3 Drawing Sheets

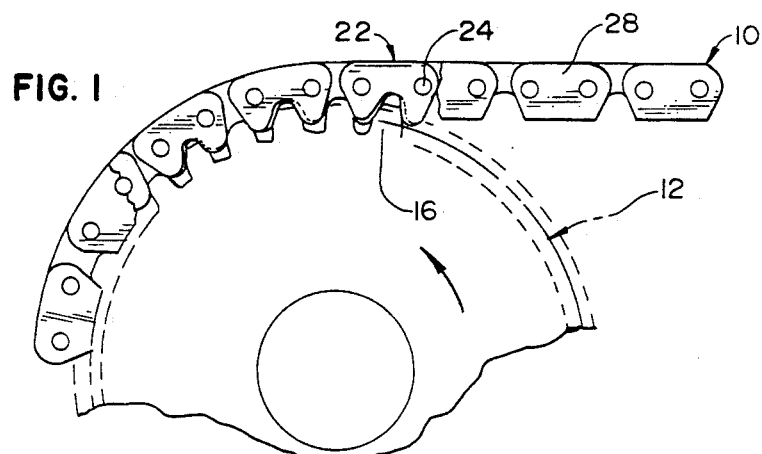
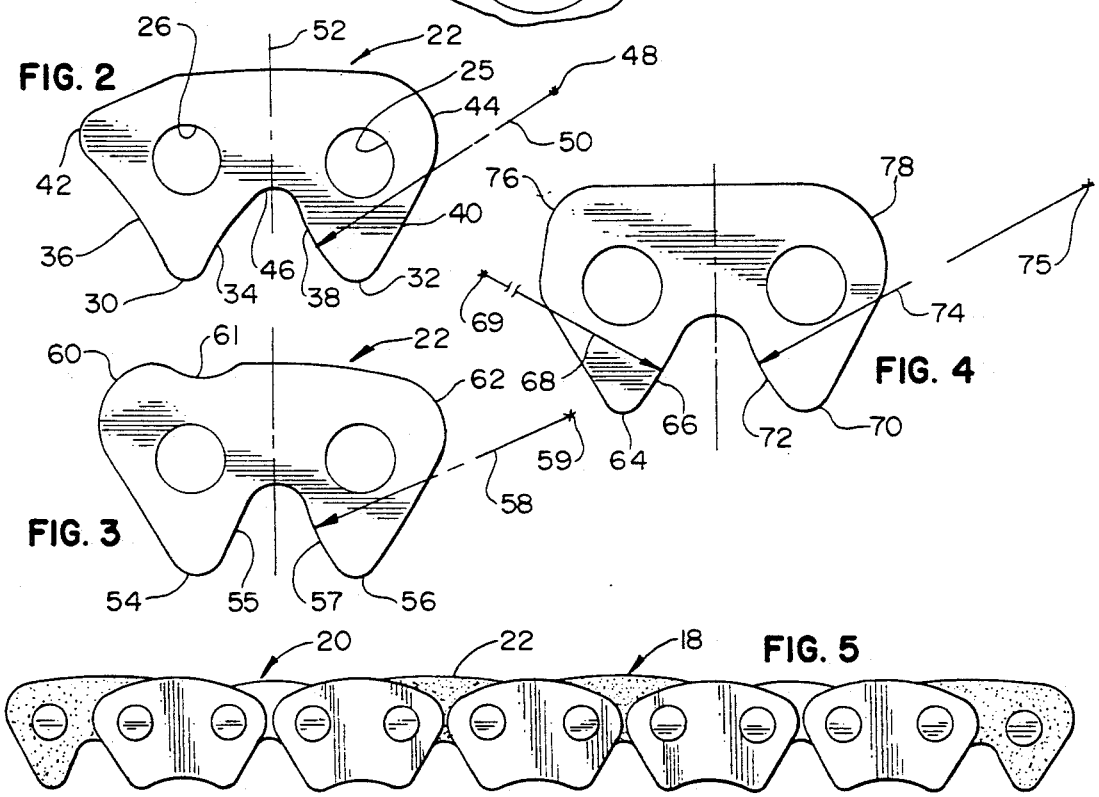
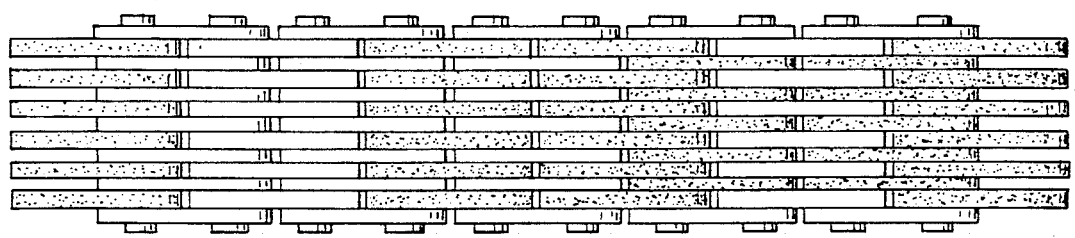

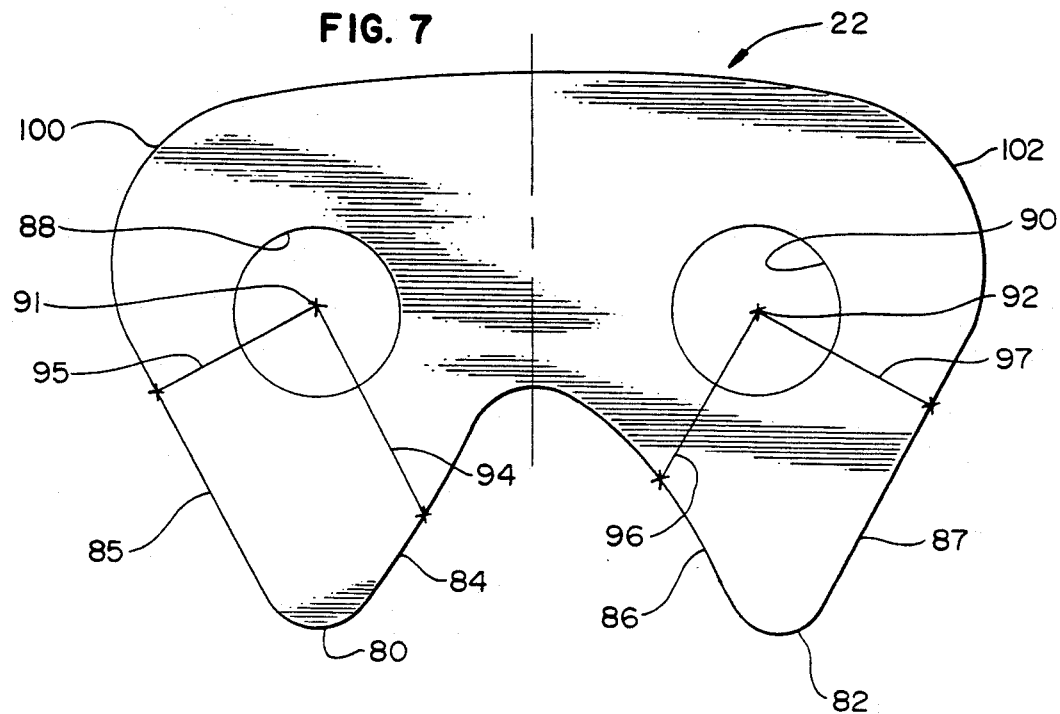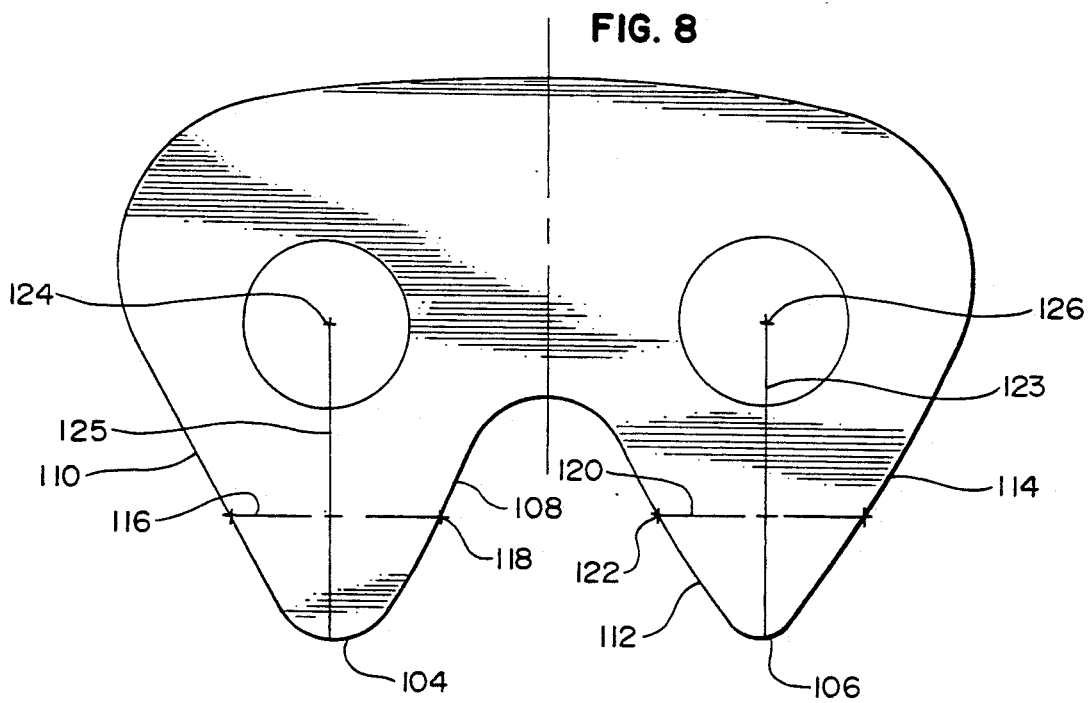

POWER TRANSMISSION CHAIN CONSTRUCTED WITH ASYMMETRICAL LINKS

BACKGROUND OF THE INVENTION

1. Field of the Invention

The present invention relates to power transmission chains. More particularly, the present invention relates to silent chain, that is, power transmission chain comprised of interleaved sets of inverted tooth links, with the links being of asymmetrical construction.

2. Description of the Prior Art

Power transmission chains are widely used in the automotive industry. Such chains are utilized for ignition timing as well as for the transfer of power from the engine to the transmission or for the transfer of power in a transfer case. Power transmission chains are also widely used in industrial applications.

One type of power transmission chain is referred to as "silent chain". Such a chain is formed of interleaved sets of inverted tooth links. A set or rank of links is assembled from several links positioned alongside of or adjacent to each other. The links are connected by pivot means, which are typically round pins or rocker joint pins, received in a pair of apertures. The links each have a pair of teeth or toes, which are defined by outside and inside flanks. The inside flanks of the toes are joined at a crotch.

The conventional power transmission chain drive comprises an endless chain of interleaved sets of links which is wrapped around two spaced sprockets supported on two generally parallel shafts. One of the shafts is typically the input shaft, which carries the driving sprocket, while the other shaft is the output shaft, which carries the driven sprocket. The links of the chain are adapted to fit over and about the teeth of the sprockets to enable the transmission of power from the input shaft and driving sprocket, through the chain, to the driven sprocket and output shaft.

Historically, silent chains have been constructed in which all of the links have the identical shape or configuration and all oriented in the same direction. Silent chains of more recent vintage generally are constructed of links which are all of identical configuration and are symmetrical. The links of such chains are generally of a contour having both inside flanks of the links being substantially straight or, alternatively, having both inside flanks of the links being of a convex curve. The construction of the inside flanks of such links can also include alternative configurations, such as having a portion being straight, a portion being curved, or varying radii of curvature along the inside flank. Differences in design can affect the operation of the link within the chain structure.

Power transmission chains have been used for many years in the automotive industry in both timing chain applications and power transfer applications. Chains having links with substantially straight inside flanks as well as chains having links with inside flanks of different configurations have been employed in these automotive applications. Historically, great care was taken in avoiding the mixing of these two types of links in chain assembly plants manufacturing both types of links. That is, great care was taken to produce chains with all links being of the identical type and configuration.

However, it was found that a mixture of links of two different inside flank configurations in a chain provided a chain that generated less noise when used in automotive applications than did some chains constructed of links of all identical configuration. A chain containing a mixture of links of two different configurations is described in U.S. Pat. No. 4,342,560, issued on Aug. 3, 1982. That prior art patent describes the concept of the mixture of sets of links with an inside flank of a first configuration with sets of links with an inside flank of a different configuration. Those different configurations can be achieved by varying the dimensions of the links as well as the flank shapes or the aperture locations.

The broad, generic concept of U.S. Pat. No. 4,342,560 was to change contacts between link flanks and sprockets by having differently configured link flanks in different sets of the chain. For example, in one species of the invention, some sets of links are comprised of links having at least one inside flank of a substantially straight configuration, while other sets of links are comprised of links having at least one inside flank of a different configuration. As the sprocket drives the chain, the sprocket teeth will contact the inside flanks of one configuration in one set of links, and will contact the inside flanks of another configuration in another set, or possibly the outside flanks of other links in the preceding set as a result of the different inside flank configuration at differing time intervals. Such differences alter or modify the contacts of the links with the sprocket.

In another species of the invention of U.S. Pat. No. 4,342,560, for example, some sets of links are comprised of so-called inside engagement type links and other sets of links are comprised of so-called outside engagement type links. The actual engagement of the links in such a chain is determined by the positioning of the sets of various types of links with respect to one another. Of course, the concept of U.S. Pat. No. 4,342,560 is broader than simply a combination of socalled inside engagement links and outside engagement links.

Thus, U.S. Pat. No. 4,342,560 is directed to the generic concept of noise reduction in a chain by providing a chain with the interspersing or mixing of links having a first inside flank configuration with links having an inside flank of a different configuration. Such a chain utilizes the noise reduction technique of attempting to modify the pattern of sound emanating from the chain contacting the sprocket by altering the types of configurations and thus altering the point and rhythm of contacts. Prior to U.S. Pat. No. 4,342,560, patents and structures taught and suggested the use of the driving links of the chain (as opposed to the guide links on the outside solely for the purpose of guiding the chain) of all identical inside flank configuration. The prior art did not teach or suggest the mixing of sets of links of a first inside flank configuration with sets of links of a different inside flank configuration together in the same chain assembly. Indeed, the prior art U.S. Pat. No. 3,377,875 to Sand and U.S. Pat. No. 3,495,468 to Griffel, both taught the modification of the sprocket teeth, rather than modification of the profile of the chain link flank, in order to modify the rhythm of the chain and sprocket contacts.

One advantage of using such a "hybrid" chain of two configurations of links is the avoidance of the need to modify the teeth of the sprocket. However, the two configurations of links must be kept separate during processing prior to assembly and then brought together to form the correct sets during manufacture. The optimal pattern of sets of links within the chain is determined prior to assembly and the separation of links prior to assembly is extremely important in order to achieve that pattern. As set forth in the U.S. Pat. Nos. 4,509,323 and 4,509,937, the outside upper surfaces of the links can be appropriately marked or identified by a shape in order to facilitate mixing of the links in proper positions during assembly.

The present invention is a species of the generic concept set forth in U.S. Pat. No. 4,342,560. The present invention overcomes the problem of separation by providing a chain formed of links all having the same overall outside contour. However, the links are asymmetrical in contour and are then given different orientations in the chain in order to provide the same result as the hybrid chain of U.S. Pat. No. 4,342,560. The links of U.S. Pat. No. 4,342,560 achieve that result by a link with a leading inside flank of a first configuration mixed with a link with a leading inside flank of a second configuration.

The links of the present invention are an asymmetrical combination of the two links of U.S. Pat. No. 4,342,560, which are oriented in two directions. Prior to assembly, when the links of the present invention are all oriented in the same direction, the links represent one link form. During and after assembly, the links comprise two links forms by virtue of their orientation in the claim assembly. In this manner, the links of the present invention perform the same function, contacting the sprocket in a random manner, in the same way, by having a link with a leading inside flank of a first configuration mixed with a link of a leading inside flank of a different configuration, to achieve the same result, modification of or altering of the chain and sprocket contacts. In the claims of both U.S. Pat. No. 4,342,560 and the present invention, the leading inside flank is modified by use of a different configuration of link or by orientation of the asymmetric link. Of course, in each case, the leading inside flank is the flank which primarily effects the link and sprocket contacts.

OBJECTS OF THE INVENTION

Accordingly, it is an object of this invention to provide a power transmission chain which provides alteration of chain and sprocket tooth contacts and yet avoids the necessity of separation of links prior to chain assembly.

It is a specific object of this invention to provide a power transmission chain formed of asymmetrical links being oriented in some sets of links in a first direction and being oriented in other sets of links in a different direction.

It is an object of this invention to provide a power transmission chain formed of asymmetrical links being oriented in some sets of links in a first direction and being oriented in other sets of links in a different direction, with the sets of links mixed in a predetermined random pattern.

It is another object of this invention to provide a power transmission chain formed of asymmetrical links being oriented in some sets of links in a first direction and being oriented in other sets of links in a different direction, in which the chain can be operated in both directions.

It is a further object of this invention to provide a power transmission chain formed of asymmetrical links which has an indication on the link to facilitate orientation of the links in the proper order in the chain.

Other objects, advantages and features of the present invention will become apparent upon reading the following detailed description and appended claims, and upon reference to the accompanying drawings.

SUMMARY OF THE INVENTION

In accordance with one embodiment of this invention, a power transmission chain is comprised of a plurality of interleaved sets of metal links. Pivot means, preferably in the form of round pins, or other type of pivot joint, such as a pin and rocker joint, connect adjacent sets of links by fitting into a pair of apertures in the links. Each of the links of the chain has a pair of toes separated by a crotch. Each of the toes is defined by an outside flank and an inside flank, with the inside flanks of each link being joined at the crotch. The chain may also include guide links to guide the chain on the sprockets. Such guide links do not drivingly engage the sprocket teeth.

The links of the chain are asymmetrical in configuration with some links being oriented in a first direction and other links being oriented in the opposite direction. The asymmetrical form includes a first toe having an inside flank of a first configuration and a second toe having an inside flank of a different configuration. The first configuration includes either a substantially straight surface or a curved surface. Both the first configuration and the different configuration can be curved surfaces. The curved surface is generally only along a portion of the inside flank of the link; a portion of the flanks of the links may be substantially identical.

The differing curved surfaces of the inside flanks can be formed by differing radii of curvature as measured from points relative to the centerline. Alternatively, the differing curved surfaces can be formed by the same radius of curvature as measured from different points relative to the centerline.

Each of the toes preferably contains a different configuration on the outside upper surface of the link. These upper surface configurations serve as designations of the particular toes to facilitate orientation of the links in the chain.

The asymmetrical link forms can be constructed and arranged in a number of different patterns. For example, the chain can be constructed with a mixture of symmetrical links and asymmetrical links or two different asymmetrical links.

Use of a chain constructed in accordance with the teachings of this invention with a sprocket results in the generation of a noise pattern that is modified in comparison with the noise pattern generated by a chain and sprocket in which all links are of an identical and symmetrical configuration. The differing orientations with the asymmetrical configuration modifies the pattern of contacts between the chain and the sprocket. The chain of this invention is suitable for use with a variety of sprocket tooth forms including sprockets in which the profile of the teeth is defined by an involute.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a side view of a portion of a sprocket and a segment of a chain constructed according to the teachings of the present invention, with portions broken away;

FIG. 2 is a side view of a link form used in the chain shown in FIG. 1;

FIG. 3 is a side view of an alternative embodiment of a link form used in the chain shown in FIG. 1;

FIG. 4 is a side view of alternative embodiment of a link form used in the chain shown in FIG. 1;

FIG. 5 is a side view of a segment of a chain constructed according to the teachings of the present invention, showing the pattern of sets of links;

FIG. 6 is a plan view of the segment of chain shown in FIG. 5; with shading used to identify orientation of links;

FIG. 7 is a side view of an alternative embodiment of a link form used in the chain shown in FIG. 1;

FIG. 8 is a side view of an alternative embodiment of a link form used in the chain shown in FIG. 1;

DETAILED DESCRIPTION OF THE DRAWINGS

Figure 9:
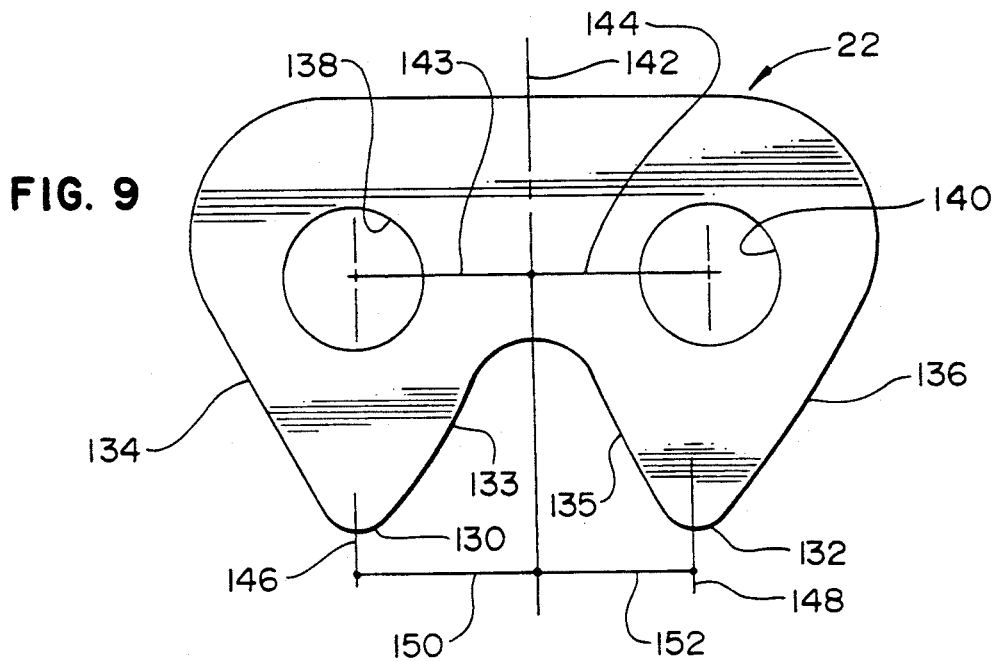
FIG. 9 is a side view of an alternative embodiment of a link form used in the chain shown in FIG. 1; and, FIG. 10 is a side view of an alternative embodiment of a link form used in the chain shown in FIG. 1, showing the rocker joint pins and associated aperture.

Turning now to the drawings, FIG. 1 illustrates a portion of a power transmission chain and sprocket drive including a chain 10 and a sprocket 12. The sprocket 12 is driven about shaft 14 and includes a plurality of spaced teeth 16. The complete chain drive system includes at least a pair of sprockets which may be of different diameters and have a different number of differently shaped teeth. The sprocket teeth may be evenly or unevenly spaced.

The chain is constructed of joined or interleaved sets 18, 20 of links 22. The sets or ranks 18, 20 are more clearly shown in FIG. 6. The shading in FIG. 6 is to identify a different orientation of the links, not a different configuration of the links. The sets are formed of a plurality of links placed in side-by-side relationship. The links of the interleaved set are preferably alternated by row with the links of the first set. The links 22 are asymmetrical in configuration and are shown in alternative embodiments in FIGS. 2, 3, 4, 7, 8, 9 and 10. The adjacent sets of links are joined by pivot means 24, illustrated as round pins. The pivot means are received in aligned sets of apertures 25. Each link preferably includes a pair of apertures 25, 26, located at opposite ends of the link.

Guide links 28 are provided which maintain the lateral alignment of the chain on the sprockets. The guide links illustrated are along the outside of the chain and have no driving engagement with the sprocket teeth. Thus, the guide links are distinguished from the other toothed links 22, or driving links. An inside guide link (not shown) may also be used in which case the sprocket is grooved to receive the guide links. The pivot means 24 are usually peened over to maintain the integrity of the chain assembly; however, other methods may be used if desirable.

Each of the links 22 is of identical overall contour. The links are of asymmetrical form and are oriented in different directions in the ranks. For example, links in set 18 are oriented in a first direction, while the links in set 20 are oriented in the opposite, or reverse, direction.

Link 22 is illustrated in FIG. 2 and is defined by a pair of spaced toes 30, 32. The first toe 30 is defined by an inside flank 34 and an outside flank 36. The second toe 32 is defined by an inside flank 38 and an outside flank 40. The first toe 30 includes upper surface 42 while the second toe 32 includes upper surface 44. The upper surface is in the portion of the link above a horizontal centerline through the apertures. The upper surface 42 of the first toe 30 is extended to form an acute angle in contrast to the rounded shape of the upper surface 44 of the second toe 32. The different configurations of the upper surfaces facilitate identification of the portions of the link. The inside flanks 34, 38 of the two toes are joined at crotch 46.

The inside flank 34 of the first toe 30 is concavely curved in an inward direction or reverse direction of the link. The inside flank 38 of the second toe 32 is convexly curved, or bulging outward, with the center of curvature designated by the reference character 48. The radius of curvature 50 defines the curvature of the inside flank 38, relative to the center of curvature 48.

The link is generally divided into two portions at the vertical centerline 52. The centerline 52 extends approximately through the center of the crotch 46. The two portions of the link define two orientations of the link on the basis of the direction of the link in the chain. A first orientation is the link connected in the chain with the first toe leading the chain toward contact with the sprocket and the second toe following the first toe. A second orientation is the link connected in the chain with the second toe leading the chain toward contact with the sprocket and the first toe following the second toe. Thus, if the first orientation of the link is the link as shown in FIG. 2, the second orientation is the link reversed in direction, or flip-flopped in direction.

The sets of links are preferably formed with the links oriented in the same direction. Thus, in assembling the chain, some sets of links are formed with the links oriented in a first direction and other sets of links are formed with links oriented in a second, or opposite, direction. By arranging the sets in such a manner, the pattern of contacts of the link flanks with the sprocket teeth is varied. In other words, the points and rhythm of the contacts of the links with the sprocket teeth is altered by the different orientations of links. Use of a chain constructed in this manner with a sprocket results in the generation of a noise pattern that is modified in comparison with the noise pattern generated by a chain and sprocket in which all links are of a identical and symmetrical configuration.

The links shown in FIGS. 3, 4, 7, 8, 9 and 10 are alternative embodiments of the asymmetrical link shown in FIG. 2. In FIG. 3, the first toe 54 has a substantially straight inside flank 55. The term substantially straight implies a configuration which is generally straight, but is not necessarily limited to perfectly or absolutely geometrically straight. The second toe 56 has a curved inside flank 57. The curved inside flank 57 has a radius of curvature 58 as defined from reference character 59.

The first toe 54 of the link 22 shown in FIG. 3 has an upper surface 60 with a dip or inward curve 61. The second toe 56 has rounded upper surface 62. The different configurations of upper surfaces 60, 62 facilitate identification of the links in either of the two available orientations. That is, a first orientation of the link with the first toe 54 leading the chain toward contact with the sprocket and the second toe trailing the first toe, and a second orientation of the link with the second toe 56 leading the chain toward contact with the sprocket and the first toe trailing the second toe.

The embodiment of the link 22 shown in FIG. 4 has a first toe 64 with a curved inside flank 66. The curved inside flank 66 has a radius of curvature 68 as defined from reference character 69. The second toe 70 also has a curved inside flank 72. The curved inside flank 72 has a radius of curvature 74 as defined from reference character 75. Variation of the locations of the reference points 69, 75, as well as variation of the lengths of the radii of curvature 68, 74, results in variation of the curvatures of the inside flanks 66, 72. In this manner, the link 22 is provided with differing configurations of the first toe 64 and the second toe 70.

The upper surface 76 of the first toe 64 is of a truncated curve, in contrast to the rounded curve of the upper surface 78 of the second toe 70. The different configurations of the upper surfaces 76, 78 facilitate identification of the links in either of the two available directions or orientations.

The sets or ranks of links can be assembled in many patterns. As shown in FIGS. 5 and 6, the sets of links in a first orientation may be altered with the sets of links in the different orientation. The alteration of sets may occur in a repeated pattern of sets or in a predetermined random pattern of sets. Alternatively, the links may be randomly oriented throughout the chain. For example, the links can be alternated in each rank, with the alterations staggered in each row. A row of links is the series of links in a particular location of the rank as viewed longitudinally of the chain. Thus, the links in a row are typically not directly interleaved, but spaced; the links are interleaved with the adjacent link in the adjacent rank.

An alternative embodiment of the asymmetrical link 22 is shown in FIG. 7. The link has a first toe 80 and a second toe 82. The first toe is formed by inside flank 84 and outside flank 85, while the second toe is formed by inside flank 86 and outside flank 87. The pair of apertures 88, 90 include centers as marked by reference characters 91, 92. The asymmetrical configuration of the link is achieved by differences in the distances from the centers of the apertures to the flanks of the toes. In the first toe 80, the distance from the aperture center 91 to the inside flank 84, as shown by line 94, is greater than the distance from the aperture center 91 to the outside flank 85, as shown by line 95. In the second toe 82, the distance from the aperture center 92 to the inside flank 86, as shown by line 96, is less than the distance from the aperture center 92 to the outside flank 87, as shown by line 97. The distances 94, 95 can also be measured by the perpendicular distance from the center of the nearest aperture or pin hole opening to the tangents of the inside and outside flanks.

The alternative embodiment of link 22 shown in FIG. 7 can be constructed with other relative aperture center to flank distances. For example, the distance from the aperture centers to the inside flanks of both toes can be greater than the distance from the aperture centers to the outside flanks of both toes, as long as the distances are such so as to create an asymmetrical link. The results of the invention are achieved by the utilization of the links in some sets of the chain in a first orientation and in other sets of the chain in the opposite orientation. The upper surfaces 100, 102 of the two toes are differently shaped in order to facilitate orientation of the links in the chain.

Another alternative embodiment of the asymmetrical link 22 is shown in FIG. 8. The link has a first toe 104 and a second toe 106. The first toe is formed by diverging inside flank 108 and outside flank 110, while the second toe is formed by diverging inside flank 112 and outside flank 114. The asymmetrical configuration of the link is achieved by differences in the widths of the toes of the links. The width of the first toe 104, as shown by distance 116 at an arbitrary point 118 along the inside flank 108, is different from the width of the second toe 106, as shown by distance 120 at the same point 122 relative to the centers of the apertures 124, 126. The differences in the widths of the toes, or the distances of separation of the flanks, provides an asymmetrical link. The alternative embodiment of FIG. 8 can also be constructed by shortening the second toe relative to the first toe. That is, forming the link with different distances 123, 125 from the aperture centers 124, 126 to the bases of the first and second toes 104, 106, so that one toe is longer than the other toe. For example, distance 123 would be greater than distance 125, resulting in toes of different lengths.

Another alternative embodiment of the asymmetrical link 22 of the chain of the present invention is shown in FIG. 9. The link has a first toe 130 and a second toe 132. The first toe is formed by inside flank 133 and outside flank 134, while the second toe is formed by inside flank 135 and outside flank 136.

The asymmetrical configuration of the link of FIG. 9 is achieved by differences in the distances from the link centerline to the centerlines of the first and second toe. The link includes a pair of apertures 138 and 140, which are preferably equally spaced from the link centerline 142. That is, the distance 143 from the centerline 142 to the center of the first aperture 138 is equal to the distance 144 from the centerline 142 to the center of the second aperture. The distances 143, 144 are measured along the horizontal centerline of the link in FIG. 9.

The first toe 130 has a first centerline 146 through its center, while the second toe has a second centerline 148 through its center. The distance 150 from the first toe center line 146 to the link centerline 142 is not equal to the distance 152 from the second toe centerline 148 to the link centerline 142. The distances in toe separation provides an asymmetrical link.

Figure 10:
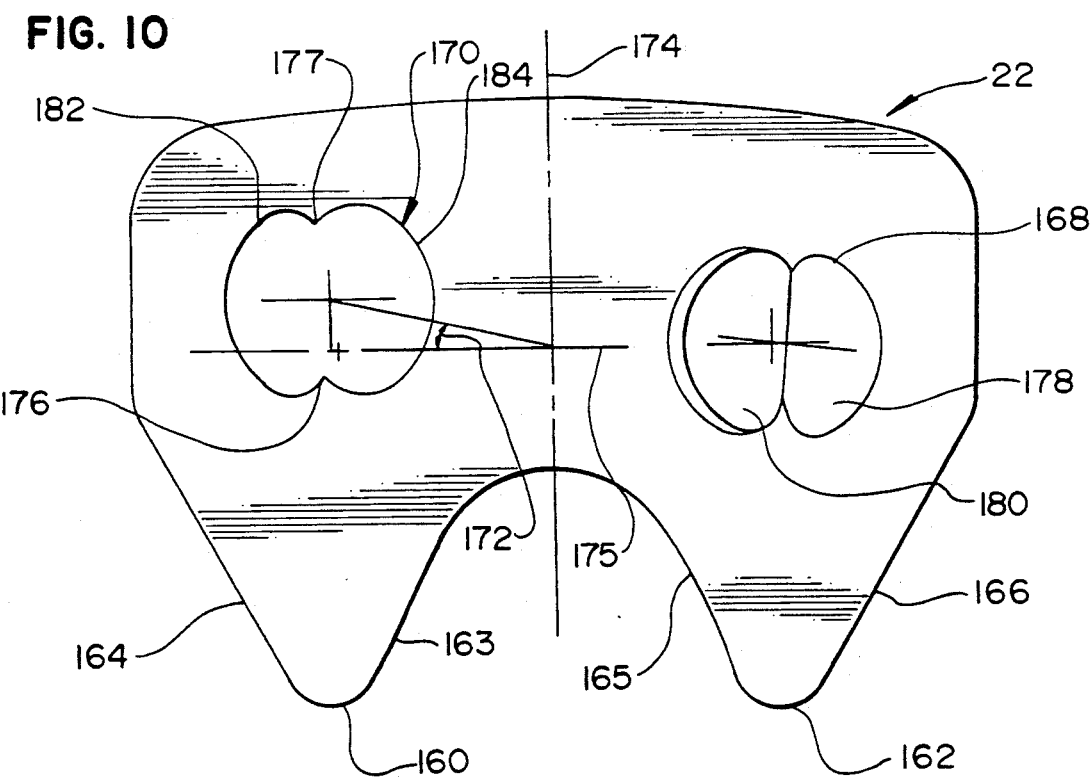

Another alternative embodiment of the asymmetrical link 22 of the chain of the present invention is shown in FIG. 10. The link has a first toe 160 and a second toe 162. The first toe is formed by inside flank 163 and outside flank 164, while the second toe is formed by inside flank 165 and outside flank 166.

The asymmetrical configuration of the link of FIG. 10 is achieved by difference in the distances from the centers of the apertures to the working surfaces or contacting surfaces of the inside and outside flanks of the link. The link includes a first aperture 168, which is located along the centerline of the link, and a second aperture 170, which is located at a position rotated through angle 172 from the centerline. By locating the apertures at different relative positions with respect to the inside and outside flanks of the link, an asymmetrical configuration is achieved. Such an embodiment may also be constructed by locating either or both apertures vertically or horizontally at different relative positions with respect to vertical centerline 174 and horizontal centerline 175 of the link.

The apertures 168, 170 shown in FIG. 10 are of the rocker joint variety having a generally hour-glass shape of two oral portions connected at extending points or eyebrows 176, 177. The pivot means is constructed of two generally oval or D-shaped pins 178, 180 which are interconnected within the apertures. The oval portions of the apertures 168, 170 are of two different sizes, as shown in FIG. 10, with oval portion 182 being larger than oval portion 184. The pins have a substantially tight fit within oval 182 while oval 184 allows free pin rotation. Thus, when the links are oriented in different directions, the pins of the rocker joint will roll against one another. The rocker joint pivot means can be used, where practical, with other embodiments of the invention than the embodiment shown in FIG. 10.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A power transmission chain comprised of a plurality of interleaved sets of links, pivot means connecting adjacent sets of links, the links of said chain each having a pair of toes separated by a crotch, and each link defining a pair of apertures for receiving said pivot means,
   some sets of links being comprised of links having a first toe of a first predetermined configuration and a second toe of a different configuration, said links being oriented in a first direction, and other sets of links being comprised of links having a first toe of a said first predetermined configuration and a second toe of said different configuration, said links being oriented in an opposite direction, each link in each set being oriented in the same direction,
   said sets of links oriented in said first direction having a leading upper surface of a first configuration, and said sets of links oriented in said opposite direction having a leading upper surface of a different configuration, whereby said link orientation is more easily identifiable,
   said links oriented in said first direction being randomly arranged with said links oriented in said opposite direction.

2. The power transmission chain of claim 1 wherein said first upper surface configuration is a rounded surface.

3. The power transmission chain of claim 1 wherein said first upper surface configuration is an extended surface forming an acute angle.

4. The power transmission chain of claim 1 wherein said first upper surface configuration is a flat surface having an inward dip.

5. The power transmission chain of claim 1 wherein said first upper surface configuration is a truncated curve.

6. A power transmission chain comprised of a plurality of interleaved sets of links, the links of said chain each having a pair of toes separated by a crotch,
   some sets of links being comprised of links of asymmetrical configuration, said links being oriented in a first direction, and other sets of links being comprised of links of said asymmetrical configuration, said links being oriented in an opposite direction,
   each link having a pair of longitudinally spaced apertures, the apertures of one set of links being transversely aligned with the apertures of an adjacent set of links, pivot means in each aligned set of apertures connecting adjacent sets of links, at least one of said apertures being of generally hourglass shape with enlarged rounded ends joined by an intermediate neck portion, said enlarged rounded ends adapted to receive said pivot means therein,
   said links oriented in said first direction being randomly arranged with said links oriented in said opposite direction.

7. The power transmission chain of claim 6 wherein said pivot means includes a pin member having a rounded back surface and each aperture having a complementary rounded surface cooperating with said pin member back surface to prevent relative rotation therebetween.

8. The power transmission chain of claim 6 wherein said pivot means includes a pin members in each group of aligned apertures to join the link sets, each pin member having a convex front surface and a convex back surface, the front surfaces of each pair of pin members opposing and rocking on one another, each pin member back surface having a shape substantially matching that of a portion of said back wall of said aperture and substantially engaging a back wall of each aperture in one set of the interleaved links and being free of engagement with a back wall of each aperture in the other set of interleaved links through which said pair of pin members extend.

9. The power transmission chain of claim 8 wherein at least one of said apertures is offset from the vertical centerline of the link.

10. The power transmission chain of claim 8 wherein at least one of said apertures is offset from the horizontal centerline of the link.

11. The power transmission chain of claim 6 wherein said asymmetrical configuration comprises one toe of each link being different in shape than the other toe of each link.

12. The power transmission chain of claim 6 wherein each link in each of said sets is oriented in the same direction, said some sets of links are randomly arranged with said other sets of links.

* * * * *

UNITED STATES PATENT AND TRADEMARK OFFICE
CERTIFICATE OF CORRECTION

PATENT NO. : 5,154,674
DATED : October 13, 1992
INVENTOR(S) : Stellios A. Avramidis It is certified that error appears in the above-indentified patent and that said Letters Patent is hereby corrected as shown below:

<u>On the Title Page</u> after "Assignee: Borg-Warner Automotive Transmission & Engine Components Corporation, Sterling Heights, Mich." insert --Notice: The portion of this patent subsequent to February 28, 2009 has been disclaimed.--

<u>In the Claims</u>
 Col. 10, line 31:
    In claim 8, line 2, before "pin members" insert --pair of--.

Signed and Sealed this

Sixteenth Day of April, 1996

Attest:

BRUCE LEHMAN

Attesting Officer                Commissioner of Patents and Trademarks